Oct. 31, 1961 R. L. SCULLY 3,006,803
TIRE TREAD APPLYING MACHINE
Filed Oct. 27, 1958 3 Sheets-Sheet 3
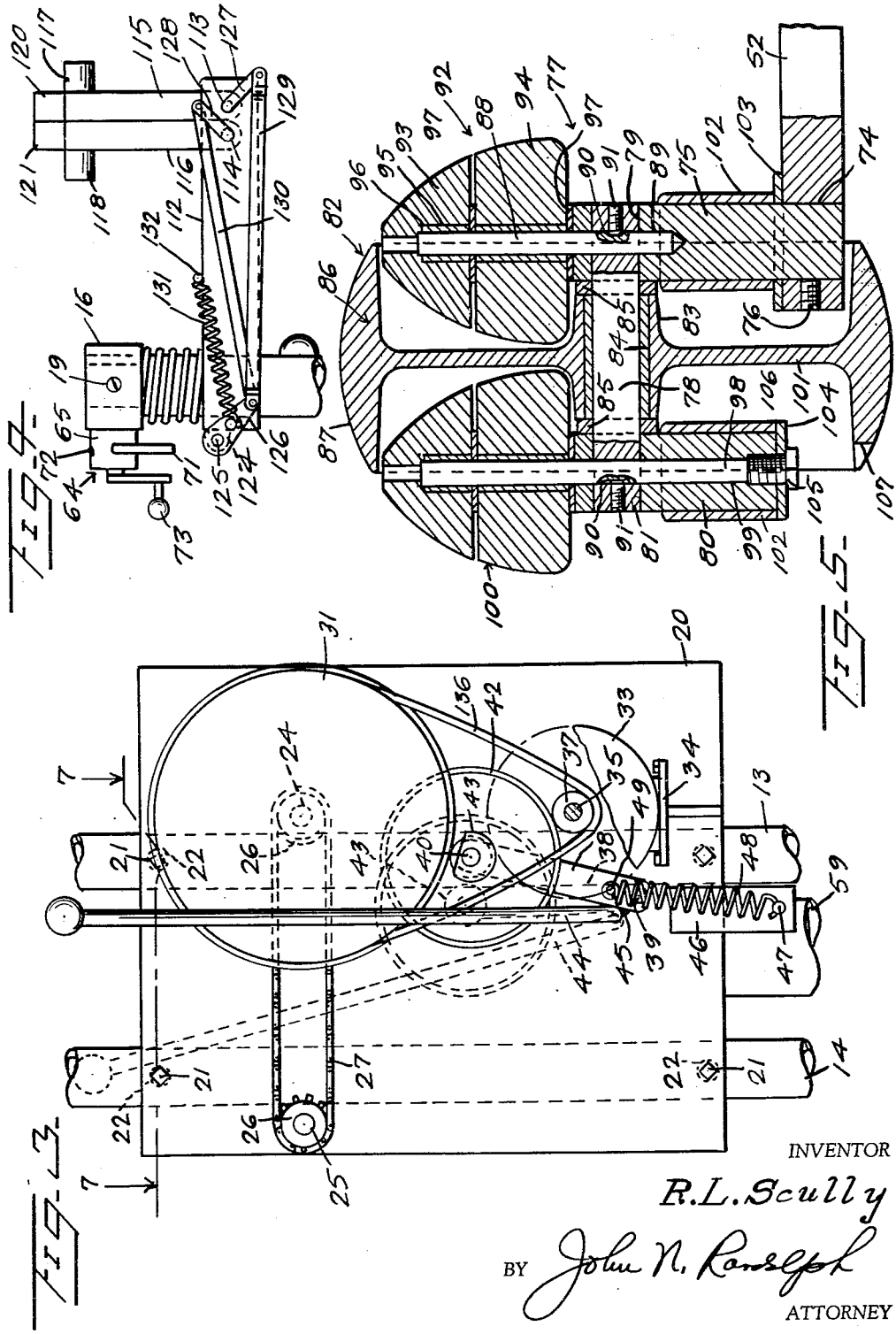
INVENTOR
R.L.Scully
BY John N. Randolph
ATTORNEY

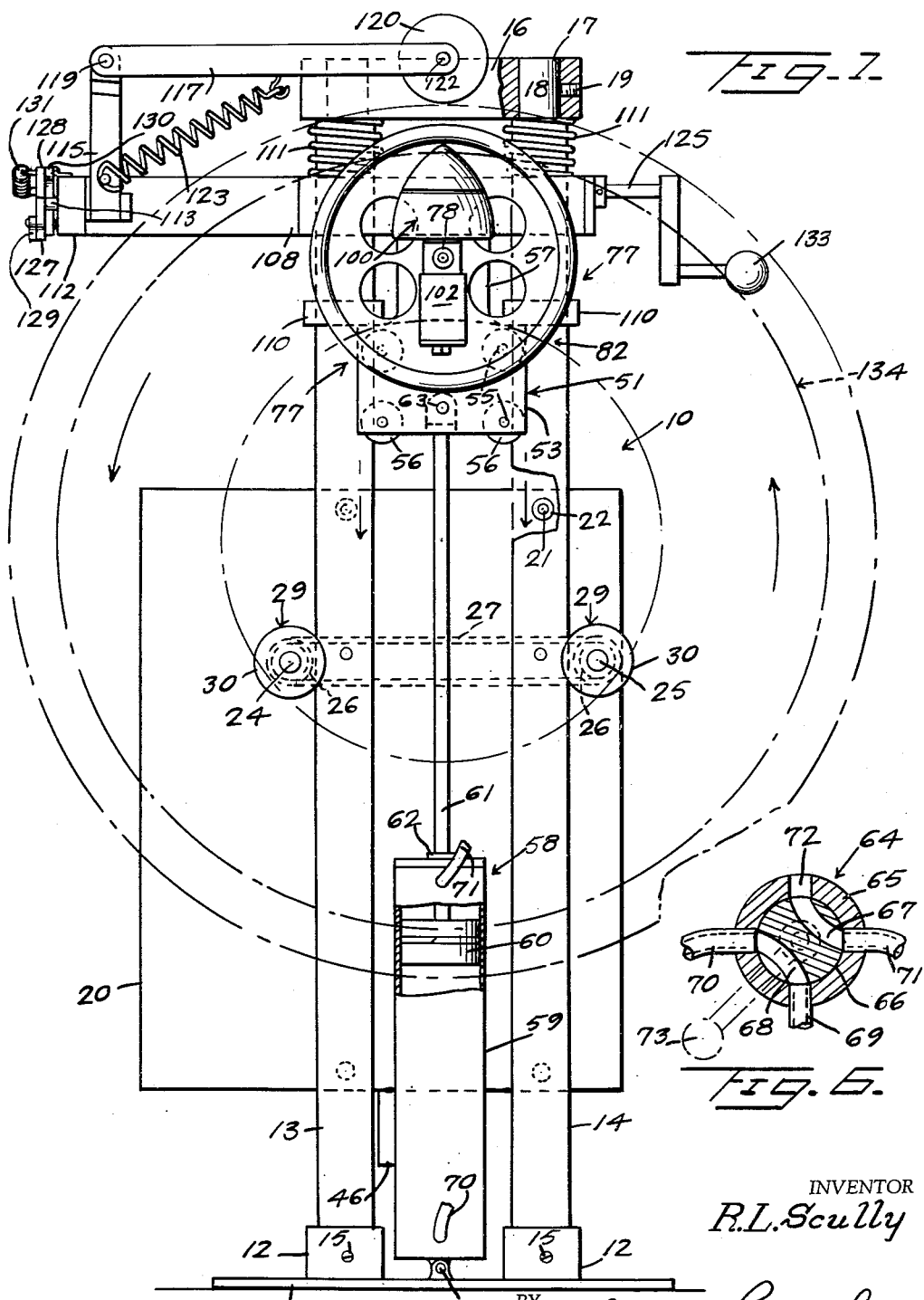

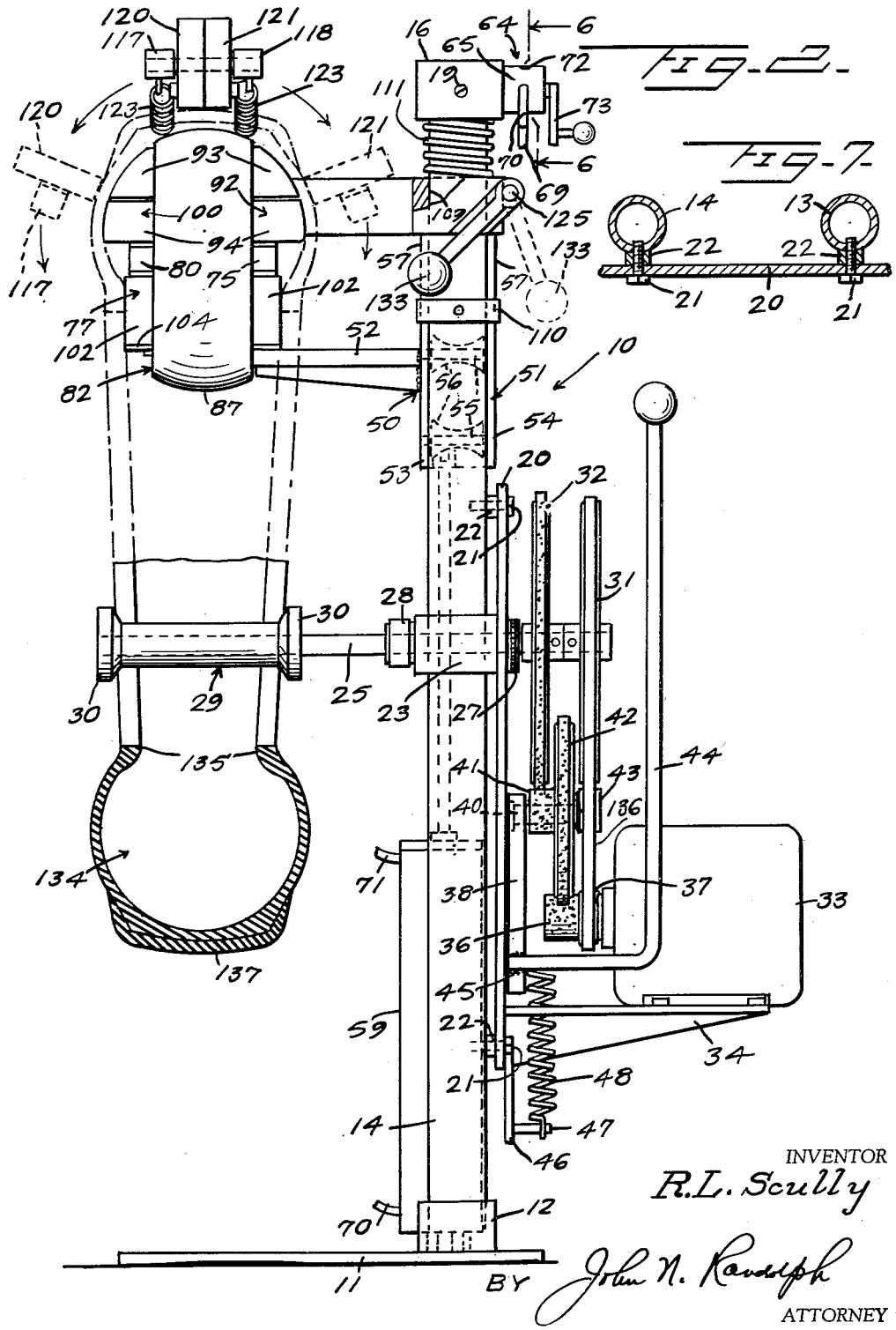

United States Patent Office 3,006,803
Patented Oct. 31, 1961

3,006,803
TIRE TREAD APPLYING MACHINE
Robert L. Scully, Oak Harbor, Wash., assignor to Balloon Tire Mould Co., Inc., Los Angeles, Calif., a corporation of California
Filed Oct. 27, 1958, Ser. No. 769,779
7 Claims. (Cl. 156—407)

This invention relates to a machine for supporting and rotating a pneumatic tire casing for applying new tread rubber to a worn tire casing or carcass in an expeditious and precise manner.

Another object of the invention is to provide a machine which can also be utilized for revolving a tire casing or carcass for other purposes such as applying a coating of cement or other bonding medium, by a spray method or otherwise to the portion of the exterior of the tire carcass to which the new tread rubber is to be secured.

A further object of the invention is to provide a machine which will adjust itself automatically to accommodate tire casings of different sizes, and which is capable of operating efficiently for applying and securing new tread rubber to tire carcasses of different sizes without unduly distorting or stretching the new tread rubber.

A further object of the invention is to provide a machine of extremely simple yet unique construction which will be extremely efficient and durable in operation and which is so constructed as to minimize the friction factors involved in supporting a tire casing properly distended to be revolved while new tread rubber is being applied thereto, to thus minimize the power required to operate the machine.

Still another object of the invention is to provide a machine having power-driven parts movable relative to one another for applying a tire casing to the machine and in a position to be rotated thereby and for removing the tire casing from the machine and without requiring the use of manual force in either of said operations.

Various other objects and advantages of the invention will hereinafter become more fully apparent from the following description of the drawings, illustrating a presently preferred embodiment thereof, and wherein:

FIGURE 1 is a front elevational view, partly broken away, of the tire tread applying machine;

FIGURE 2 is a side elevational view thereof, partly broken away, looking from right to left of FIGURE 1;

FIGURE 3 is a fragmentary rear elevational view of a part of the machine;

FIGURE 4 is a fragmentary side elevational view of the upper part of the machine, looking from left to right of FIGURE 1;

FIGURE 5 is an enlarged fragmentary central vertical sectional view, partly in elevation, of the mandrel portion of the machine;

FIGURE 6 is an enlarged fragmentary vertical sectional view of a part of the machine, taken substantially along the line 6—6 of FIGURE 2; and FIGURE 7 is a fragmentary horizontal sectional view taken substantially along a plane as indicated by the line 7—7 of FIGURE 3.

Referring more specifically to the drawings, the tire tread applying machine in its entirety is designated generally 10 and includes a base 11 which is adapted to rest upon any suitable supporting surface. A pair of laterally spaced sockets 12 are fixed to and rise from the base 11 to receive the lower ends of two upright posts 13 and 14 which may be secured in said sockets 12 in any suitable manner, as by setscrews 15. The posts 13 and 14 are of circular cross section, and may be tubular, as seen in FIGURE 7. A head 16 is secured in any suitable manner to the upper ends of the posts 13 and 14, to combine with the base 11 and sockets 12 for maintaining the axes of said posts parallel to one another. For example, as illustrated in FIGURE 1, the head 16 may be provided with bores 17 to receive restricted upper ends 18 of the posts 13 and 14, and may be provided with setscrews 19 for securing the head to said posts.

A mounting plate 20 is secured by fastenings 21 to the posts 13 and 14, and spacing elements 22 are carried by the fastenings 21 for spacing the plate 20 from the posts 13 and 14, for a purpose which will hereinafter become apparent. The plate 20 is supported behind the posts 13 and 14 and in an upright position. The parts previously described constitute the frame of the machine 10.

The posts 13 and 14 have bearings 23 fixed to their outer side and disposed in the same horizontal plane. Shafts 24 and 25 have portions journaled in said bearings 23 and other portions extending loosely through the plate 20. Sprocket wheels 26 are fixed to the shafts 24 and 25, immediately behind the plate 20, and an endless chain 27 is trained over said sprocket wheels for causing the shafts 24 and 25 to turn in unison. If desired, a belt and pulley drive may be substituted for the sprocket wheel and chain drive, for connecting the shafts 24 and 25. Stop collars 28 are preferably fixed to the shafts 24 and 25 and are disposed immediately in front of the bearings 23 to cooperate with the sprocket wheels 26 to prevent sliding movement of the shafts in the bearings. Rollers 29, having enlarged flanged ends 30, are fixed to the forward ends of the shafts 24 and 25 and are spaced forwardly from the collars 28, as seen in FIGURE 2.

The shaft 24, which is journaled in the bearing 23 of the post 13, extends rearwardly beyond its sprocket wheel 26 and has a large belt pulley 31 fixed to its rear end and a large diameter friction wheel 32, fixed thereto between said sprocket wheel 26 and the belt pulley 31. A power source 33, such as an electric motor, is mounted on and fixed to a bracket 34 which is in turn secured to and extends rearwardly from a bottom portion of the mounting plate 20. A drive shaft 35 of the motor 33 has a small diameter friction hub 36 fixed to its forward end, between said motor and the plate 20, and a small diameter belt pulley 37, fixed thereto between the motor 33 and the friction hub 36.

A supporting arm 38 is swingably mounted at its lower end on a pivot pin 39 which projects rearwardly from the plate 20. A stub shaft 40 is fixed to and extends rearwardly from the upper free end of the arm 38 and has journaled thereon a small diameter friction hub 41, a friction wheel 42 and a small belt tensioning pulley 43. The pulley 43 is disposed between and in alignment with the pulleys 31 and 37 and is free to rotate relative to the friction wheel 42 and hub 41 and is disposed at the outer, rear end of the shaft 40. The friction hub 41 and friction wheel 42 rotate as a unit and are preferably formed integral. Said parts are disposed between the arm 38 and pulley 43 and the friction wheel 42 is disposed between the hub 41 and pulley 43 and has a part thereof loosely disposed between the pulley 31 and friction wheel 32 and is positioned for movement into and out of engagement with the friction hub 36. The friction hub 41 is positioned for movement into and out of engagement with the friction wheel 32, as seen in FIGURE 2.

As viewed from the rear, or as seen in FIGURE 3, the arm 38 is pivotally mounted by the pivot element 39 slightly above and to the left of the bracket 34. An actuating lever 44 has one end secured, as by welding, as seen at 45, to the left hand edge of the arm 38 adjacent the pivot 39. The actuating lever 44, as seen in FIGURE 2, extends rearwardly and then upwardly from the arm 38. A bar 46 is fixed to and extends downwardly from a part of the plate 20 and has a rearwardly projecting pin 47 at its lower end, forming an anchor for the lower end of a tension spring 48. The upper end of the spring 48 is secured to a pin 49 which extends rearwardly from the arm 38, above and adjacent the pivot 39. Thus, the spring 48 extends across the pivot 39 and forms an over center spring, as will hereinafter be described.

A mandrel supporting bracket, designated generally 50, includes a carriage, designated generally 51, and an arm 52. The carriage 51 includes a front plate 53 and a rear plate 54 which are connected together and mounted in spaced apart relation relative to one another by pins or similar fastenings 55, each of which provides a journal for a grooved roller 56 which is supported thereby for rotation between the plates 53 and 54. The carriage 51 is provided with four rollers 56 arranged two adjacent each side edge of the carriage. The rollers 56 conformably fit portions of the posts 13 and 14 and are disposed therebetween with two of said rollers engaging each of the posts, as seen in FIGURE 1, for mounting the carriage 51 for movement vertically of the frame between said posts. The bracket arm 52 is fixed to and extends forwardly from the front plate 53. The plates 53 and 54 are provided with restricted upper portions 57, for a purpose which will hereinafter be described.

A fluid pressure responsive device, such as a pneumatic ram 58, supports the bracket 50 and effects vertical movement thereof relative to the machine frame. The ram 58 includes a cylinder 59 which is disposed loosely between lower portions of the posts 13 and 14 and which is connected, as seen at 59a, to the base 11. The cylinder 59 contains a reciprocating piston 60 having a piston rod 61 fixed thereto and extending upwardly therefrom slidably through a stuffing box 62 in the top of the cylinder 59. The upper end of the piston rod 61 is disposed between lower portions of the plates 53 and 54 and is connected thereto by a pin 63.

A valve, designated generally 64, includes a housing 65 which is fixed to the rear side of the head 16. As best seen in FIGURE 6, a core 66 is rotatably mounted in the cylindrical valve housing 65 and has two passages 67 and 68 therein. The passages 67 and 68 have ends opening outwardly of the periphery of the core 66 and said four open ends are spaced 90° apart, as seen in FIGURE 6. A conduit 69 leading from a source of compressed air, not shown, opens into the bottom portion of the valve housing chamber and conduits 70 and 71 open into said chamber of the valve housing 65 opposite to one another. The upper part of the housing 65 is provided with a vent port 72 located opposite the supply conduit 69 and equally spaced from the conduits 71 and 70. The other end of the conduit 70 opens into the cylinder 59, near the lower end thereof, and the opposite end of the conduit 71 opens into the cylinder 59 near the upper end thereof. A hand crank 73 is connected to the core 66 and is utilized for turning said core, as will hereinafter be described.

As best seen in FIGURE 5, the outer end of the bracket arm 52 is provided with a vertically disposed circular opening 74 to detachably receive therein the lower end of a post 75 which is detachably secured immovably to the arm 52 by a setscrew 76 which is threaded inwardly through the outer end of the arm 52. The post 75 forms a part of a tire engaging mandrel, designated generally 77, and which includes a stationary axle 78 one end of which fits detachably in a transverse bore 79 in the upper part of the post 75. A hanger member 80, also of circular cross section, has a transverse bore 81 in the upper part thereof in which the other end of the axle 78 is detachably received. A wheel 82 has a hub 83 disposed on the axle 78, between the post 75 and hanger 80. The hub 83 is preferably provided with a bushing 84 and spacing washers 85 are disposed between the ends of said hub and the post 75 and hanger 80. The wheel 82 has a rim 86 of substantial width transversely of the wheel and which has a peripheral surface 87 which is convexly bowed crosswise thereof. A spindle 88 has a lower end detachably mounted in an axial recess 89 of the post 75 and extending through a transverse bore 90 of the axle 78. A setscrew 91 is threaded into an end of the axle 78 and against a part of the spindle 88 for securing said spindle immovably to the post and for securing the axle immovably in the post.

A roller, designated generally 92, of acorn shape and composed of an upper section 93 and a lower section 94, is journaled on the exposed upper part of the spindle 88. The axially disposed bores 95 of the roller sections 93 and 94, in which the spindle 88 is received, are preferably provided with bushings 96. A spacing washer 97 is disposed on the spindle 88 between the roller sections 93 and 94 and a second spacing washer 97 is disposed between the underside of the lower section 94 and the upper end of the post 75. Thus, the roller sections 93 and 94 are mounted for free rotation relative to one another.

A spindle 98 has a lower portion extending substantially through an axial bore 99 of the hanger 80 and through a transverse bore 90 of the axle 78. A second setscrew 91 is threaded into the other end of the axle 78 and against a part of the spindle 98 for securing the spindle immovably relative to the axle 78 and hanger 80 and for securing the hanger 80 on the outer or forward end of the axle 78. A roller 100, corresponding with the roller 92, is mounted in the same manner as said roller 92, on the upper end of the spindle 98. The rollers 92 and 100 are spaced apart sufficiently to permit a disc portion 101 of the wheel 82 to revolve freely therebetween.

Sleeves 102 are journaled on the post 75 and hanger 80 below the axle 78. The sleeve 102 of the post 75 is supported by a washer 103 which rests on the arm 52 and the sleeve 102 of the hanger 80 is supported by a washer 104 which is secured against the lower end of said hanger by a headed bolt 105. The bolt 105 threadedly engages a threaded lower end 106 of the bore 99 and bears against the lower end of the spindle 98. A portion of the outer edge of the rim 87 is provided with an arcuate notch 107 through which the spindle 98 can pass for removing it from or applying it to the hanger 80. The rim 86 is of sufficient internal diameter to rotate freely around the rollers 92 and 100, the post 75, hanger 80 and the outer end of the arm 52, as seen in FIGURE 5.

One end of a bar 108 has parallel bores 109 extending transversely therethrough for loosely receiving portions of the posts 13 and 14 for slidably mounting the bar thereon between the head 16 and collars 110 which are fixed to the posts 13 and 14 above the carriage 51. Compression springs 111 are disposed on the posts 13 and 14 between the bar 108 and head 16. The other end of the bar 108 has a forwardly projecting right angular extension 112.

Referring to FIGURE 4, shafts 113 and 114 extend through and are journaled in the bar extension 112 and have arms 115 and 116, respectively, fixed to and extending upwardly from inner ends of said shafts. Levers 117 and 118 are pivotally mounted by pivot elements 119 on the upper ends of the arms 115 and 116, respectively, for vertical swinging movement. Said levers extend inwardly over the mandrel 77. Rollers 120 and 121 are journaled on axles 122 which extend laterally from the free end portions of the levers 117 and 118, respectively, said rollers being disposed between the free ends of the levers 117 and 118, as seen in FIGURE 2. Tension springs 123 connect the levers 117 and 118 to the arms 115 and 116, respectively, for causing said levers and the rollers 120 and 121 to swing downwardly or inwardly toward the mandrel 77.

The rear portion of the bar 108 has extensions forming bearings 124 in which is journaled a shaft 125. A lever 126 is fixed to one end of the shaft 125 and is disposed on the outer side of the bar extension 112. The shafts 113 and 114 have cranks 127 and 128, respectively, which are disposed on the outer side of the bar extension 112 and which are connected to the free end of the lever 126 by connecting rods 129 and 130, respectively, as seen in FIGURE 4. Said connecting rods 129 and 130 are both pivotally connected to the free end of the lever 126 and have opposite ends which are pivotally connected to free ends of the cranks 127 and 128, respectively. One end of a tension spring 131 is connected to the lever 126 and the opposite end thereof is connected to an anchor 132 which projects from the outer side of the bar 112. The spring 131 urges the lever 126 to swing forwardly for moving the rods 129 and 130 forwardly for turning the cranks 127 and 128 and the shafts 113 and 114 in directions for swing the arms 115 and 116 upwardly and toward one another into their positions of FIGURES 1 and 4. A manually actuated crank 133 is secured to the opposite end of the shaft 125, beyond the other end of the bar 108, for turning said shaft to swing the arms 115 and 116, the levers 117 and 118 and the rollers 120 and 121 back and forth between the full and dotted line positions of said levers and rollers, as seen in FIGURE 2.

Assuming that the parts of the machine 10 are disposed in the positions as seen in FIGURE 1, to mount the pneumatic tire casing or carcass 134 on the machine 10, the valve acuating crank 73 is swung 90° counterclockwise from its dotted line position of FIGURE 6 so that the conduit 70 is connected by the passage 67 to the vent port 72 for venting the lower part of the cylinder 59 to the atmosphere, and so that compressed air will be supplied from the conduit 69 through the passage 68 and conduit 71 to the upper end of the cylinder 59 for moving the piston 60 and bracket 50 downwardly until the mandrel 77 is disposed between the rollers 29. The tire 134 can then be conveniently applied over said mandrel and rollers. The crank 73 is then returned to its dotted line position of FIGURE 6 for venting the upper end of the cylinder 59 to the atmosphere through the conduit 71, passage 67 and port 72 and for pressurizing the lower end of the cylinder 59 through the conduit 69, passage 68 and conduit 70, for forcing the piston 60 upwardly to elevate the bracket 50 and mandrel 77. As the mandrel 77 rises, the tire will be elevated therewith until the rollers 29 engage lower portions of the tire beads 135 to prevent further upward movement of the tire with the mandrel 77. Thereafter, the mandrel will be forced upwardly between upper portions of the beads 135 and into the upper portion of the tire, as illustrated in FIGURE 2, so that the upper portion of the rim periphery 87 will comfortably engage the inner side of the peripheral portion of the tire, and the outer portions of the rollers 92 and 100 will conformably engage against the inner sides of parts of the side walls of the tire casing. The sleeves 102 will engage between and bear against the upper portions of the tire beads 135 which will be spread thereby. Lower portions of the tire beads 135 will bear against the rollers 29 and will be disposed between the flanged ends 30 thereof, as seen in FIGURE 2. As the bracket 50 approaches its elevated position of FIGURES 1 and 2, the wall extensions 57 move upwardly between the stop collars 110 into engagement with the bar 108 for displacing said bar and the parts supported thereby upwardly to compress the springs 111 and so that a proper spacing will exist between the mandrel 77 and rollers 120 and 121 when the mandrel 77 is fully elevated, and when the levers 117 and 118 are in horizontal positions as seen in FIGURES 1 and 2. Thus, the machine automatically adapts itself to tire casings 134 of different diameters, requiring at most adjustment of the stop collars 110. After the parts are disposed as seen in FIGURES 1 and 2, the valve core is turned slightly by the crank 73 for moving the passages 67 and 68 out of registration with the conduits and vent port for maintaining the lower end of the cylinder 59 pressurized.

With the motor 33 in operation, the lever 44 is moved to its full line position of FIGURE 3 so that the belt tightener pulley 43 will be disengaged from an endless belt 136 which engages over the pulleys 31 and 37, so that said belt will be slack. With the lever 44 and arm 38 in their full line positions of FIGURE 3, the friction wheel 42 engages the friction hub 36 and the friction hub 41 engages the friction wheel 32 for driving the shaft 24 from the shaft 35 and so that the shaft 25 will also be driven at the same speed and in the same direction as the shaft 24 by the sprocket wheels 26 and chain 27. The shafts 24 and 25 and their rollers 29 will thus be revolved counterclockwise at a low speed, relative to the shaft 35, as seen in FIGURE 1, for turning the tire casing 134 in the same direction or counterclockwise. An end of a strip of tread rubber or "camelback" is placed on the peripheral portion of the tire casing 134 adjacent the rollers 120 and 121, and after the tire has been revolved counterclockwise one revolution at the slow speed, by frictional engagement of the rollers 29 with the tire beads 135, the low speed transmission is disengaged by movement of the lever 44 slightly toward its dotted line position of FIGURE 3 and operation of the motor 33 is stopped. The tread rubber 137 is then cut and the usual splice is made in the ends thereof.

With the motor 33 in operation, the lever 44 is moved to its dotted line position of FIGURE 3 for disengaging the aforedescribed low speed friction drive and for moving the pulley 43 into engagement with the belt 136 for tensioning said belt to provide a direct high speed drive from the pulley 37 to the pulley 31. The tension spring 48 passes across the center of the pivot 39 during movement of the arm 38 from the friction drive to the high speed belt drive, so that said spring will hold the transmission in either the friction drive or belt drive. Thereafter and while the rollers 29 are being driven counterclockwise, as seen in FIGURE 1, at a faster speed by the belt and pulley drive for revolving the tire 134 in the same direction, the crank 133 is swung from its full line to its dotted line position of FIGURE 2 for swing the rollers 120 and 121 from their full line to their dotted line positions. The spring 131 is then permitted to return the rollers to their full line positions of FIGURE 2. This action is repeated slowly while the tire is being revolved and while the rollers 121 and 120 are being held tightly against the exterior of the tire and the new tread 137 by the springs 123 for effectively securing the new tread to the carcass. It will be understood that a coating of a bonding medium, not shown, may be applied to the tire carcass while it is being revolved and prior to application of the new tread 137.

As previously stated, the mandrel parts 82, 93, 94 and 102 are free to rotate individually relative to one another and consequently can turn at different speeds. This is of particular importance since the portions of the tire casing engaged by said rotatable parts are traveling at different speeds and the mandrel will therefore offer a minimum of resistance to rotation of the tire yet will effectively hold the part of the tire being engaged by the rollers 120 and 121 properly distended so that the new tread can be securely applied.

After completion of the aforedescribed operations the motor 33 is stopped and the crank 73 is swung to the first mentioned position thereof for venting the lower part of the cylinder 59 and for pressurizing the upper part thereof to effect lowering of the mandrel 77. As the mandrel moves down between the rollers 29, the flanged ends 30 of said rollers will engage the inner edges of parts of the tire beads 135 to prevent further downward movement of the tire and so that the mandrel 77 will thereafter be extracted from the tire by a further downward displacement thereof. It will thus be seen that the machine 10 is capable of functioning for applying the tire thereto or for removing the tire therefrom.

Various modifications and changes are contemplated and may be resorted to, without departing from the function or scope of the invention as hereinafter defined by the appended claims.

I claim as my invention:

1. In a tire supporting mandrel for positioning within the casing of a tire in a tire tread applying apparatus, the combination of: a wheel mounted for rotation about an axis parallel to the axis of rotation of the tire, said wheel having a convex periphery; and first and second rollers mounted for rotation about axes substantially radial to said axis of rotation of the tire with a roller disposed on each side of said wheel and within the periphery of said wheel, each of said rollers having a convex periphery, which said wheel and rollers adapted to engage the interior surface of the tire casing.

2. In a tire supporting mandrel for positioning within the casing of a tire in a tire tread applying apparatus, the combination of: a wheel mounted for rotation about an axis parallel to the axis of rotation of the tire, said wheel having a convex periphery; first and second rollers mounted for rotation about axes substantilly radial to said axis of rotation of the tire, with a roller disposed on each side of said wheel and within the periphery of said wheel, each of said rollers having a convex periphery; and first and second sleeves mounted for rotation about axes substantially radial to said axis of rotation of the tire with a sleeve disposed on each side of said wheel radially inward from the corresponding roller and within the periphery of said wheel, with said wheel and rollers adapted to engage the interior surface of the tire casing and said sleeves adapted to engage the respective beads of the tire.

3. In a tire supporting mandrel for positioning within the casing of a tire in a tire tread applying apparatus, the combination of: a wheel mounted for rotation about an axis parallel to the axis of rotation of the tire, said wheel having a convex periphery; first and second rollers mounted for rotation about axes substantially radial to said axis of rotation of the tire with a roller disposed on each side of said wheel and within the periphery of said wheel, each of said rollers having an acorn shape, with the cross section of said wheel and rollers forming a substantially continuous curve corresponding to the interior of the tire casing; and first and second cylindrical sleeves mounted for rotation about axes substantially radial to said axis of rotation of the tire, with a sleeve disposed on each side of said wheel radially inward from the corresponding roller and within the periphery of said wheel, with said sleeves adapted to engage the beads of the tire.

4. In an apparatus for applying tread material to a tire, the combination of: a frame; a tire supporting mandrel carried on said frame and adapted to be positioned within the tire casing, said mandrel including a wheel mounted for rotation about an axis parallel to the axis of rotation of the tire, and a pair of rollers mounted for rotation about axes substantially radial to said axis of rotation of the tire, with a roller disposed on each side of said wheel and within the periphery of said wheel, with the cross section of said wheel and rollers forming a substantially continuous curve corresponding to the interior of the tire; a tire bead roller carried on said frame for rotation about an axis parallel to said axis of rotation of the tire and positionable within the tire; means for urging said mandrel and bead roller away from each other for engaging said bead roller with the beads of the tire and said mandrel with the interior of the tire; and means for rotating the tire about said mandrel and bead roller.

5. In an apparatus for applying tread material to a tire, the combination of: a frame; a tire supporting mandrel carried on said frame and adapted to be positioned within the tire casing, said mandrel including a wheel mounted for rotation about an axis parallel to the axis of rotation of the tire, a pair of rollers mounted for rotation about axes substantially radial to said axis of rotation of the tire with a roller disposed on each side of said wheel and within the periphery of said wheel, and a pair of sleeves mounted for rotation about axes substantially radial to said axis of rotation of the tire with a sleeve disposed on each side of said wheel and radially inward from the corresponding roller; a pair of tire bead rollers carried on said frame for rotation about axes parallel to said axis of rotation of the tire and positionable within the tire; means for urging said mandrel and pair of rollers away from each other for engaging said bead rollers with the beads of the tire and said mandrel with the interior of the tire; and means for rotating the tire about said mandrel and bead rollers.

6. In apparatus for applying tread material to a tire, the combination of: a frame; a tire supporting mandrel carried on said frame and adapted to be positioned within the tire casing, said mandrel including a wheel mounted for rotation about an axis parallel to the axis of rotation of the tire, and a pair of rollers mounted for rotation about axes substantially radial to said axis of rotation of the tire, with a roller disposed on each side of said wheel and within the periphery of said wheel, with the cross section of said wheel and rollers forming a substantially continuous curve corresponding to the interior of the tire; a tire bead roller carried on said frame for rotation about an axis parallel to said axis for rotation of the tire and positionable within the tire; means for urging said mandrel and bead roller away from each other for engaging said bead roller with the beads of the tire and said mandrel with the interior of the tire; means for rotating the tire about said mandrel and bead roller; a pair of pressure rollers carried on said frame and positioned for engaging the tread of the tire at said mandrel; and means for urging said pressure rollers toward said axis of rotation of the tire with said pressure rollers moving away from the center of the tire tread as they move toward said axis of the tire.

7. An apparatus as defined in claim 6 including a bar supported by said frame; arms connected to and extending upwardly from said bar; levers pivotally connected to said arm for vertical swinging movement; means journalling said pressure rollers on free ends of said levers for rotation about axes disposed parallel to said axes of rotation of the tire; means mounting said arms for swinging movement relative to said bar about axes disposed crosswise of the axis of said pressure rollers; and manually actuated link and lever means connected to said last mentioned means for swinging the arms away from and toward one another for swinging said levers and pressure rollers back and forth relative to one another around the upper portion of said mandrel.

References Cited in the file of this patent

UNITED STATES PATENTS

| | | |
|---|---|---|
| 1,711,473 | Putt | Apr. 30, 1929 |
| 2,121,252 | Marco | June 21, 1938 |
| 2,498,953 | Glynn | Feb. 28, 1950 |
| 2,690,207 | Godfrey | Sept. 28, 1954 |
| 2,703,131 | Robbins et al. | Mar. 1, 1955 |
| 2,717,022 | Duerksen | Sept. 6, 1955 |
| 2,734,553 | Rawls | Feb. 14, 1956 |
| 2,760,550 | Kimes | Aug. 28, 1956 |
| 2,808,872 | Clapp | Oct. 8, 1957 |

UNITED STATES PATENT OFFICE
CERTIFICATION OF CORRECTION

Patent No. 3,006,803

October 31, 1961

Robert L. Scully

It is hereby certified that error appears in the above numbered patent requiring correction and that the said Letters Patent should read as corrected below.

Column 3, line 32, after "tween" insert -- the --; column 5, line 21, for "swing" read -- swinging --; line 55, for "comfortably" read -- conformably --; column 6, line 44, for "swing" read -- swinging --; column 7, line 18, for "which" read -- with --; line 31, after "tire" insert a comma; column 8, line 22, after "In" insert -- an --; line 34, for "for" read -- of --; line 51, for "axes", second occurrence, read -- axis --.

Signed and sealed this 17th day of April 1962.

(SEAL)
Attest:

ESTON G. JOHNSON
Attesting Officer

DAVID L. LADD
Commissioner of Patents